United States Patent
Hochi

(10) Patent No.: US 8,183,327 B2
(45) Date of Patent: May 22, 2012

(54) RUBBER COMPOSITION FOR TIRE AND PNEUMATIC TIRE

(75) Inventor: Kazuo Hochi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 11 days.

(21) Appl. No.: 12/888,498

(22) Filed: Sep. 23, 2010

(65) Prior Publication Data

US 2011/0071253 A1    Mar. 24, 2011

(30) Foreign Application Priority Data

Sep. 24, 2009  (JP) ................. 2009-219707
Apr. 1, 2010   (JP) ................. 2010-085421

(51) Int. Cl.
  *C08C 19/20*  (2006.01)
  *C08C 19/22*  (2006.01)
  *C08J 3/24*   (2006.01)
  *B60C 1/00*   (2006.01)

(52) U.S. Cl. .............. 525/332.7; 525/352; 524/571; 524/572; 524/573; 524/574; 524/575; 524/575.5; 152/564

(58) Field of Classification Search ........ 525/332.7, 525/352; 524/571, 572, 573, 574, 575, 575.5
  See application file for complete search history.

(56) References Cited

FOREIGN PATENT DOCUMENTS

| | | | |
|---|---|---|---|
| JP | 2001-2833 A | | 1/2001 |
| JP | 2004-521772 A | | 7/2004 |
| JP | 2005-54049 A | | 3/2005 |
| JP | 2005-105007 | * | 4/2005 |
| JP | 2005-105007 A | | 4/2005 |
| JP | 2006-45471 A | | 2/2006 |
| JP | 2007-224085 A | | 9/2007 |
| JP | 2009-84534 A | | 4/2009 |

\* cited by examiner

Primary Examiner — Roberto Rabago
(74) Attorney, Agent, or Firm — Birch, Stewart, Kolasch & Birch, LLP

(57) ABSTRACT

The present invention provides: a rubber composition for a tire having favorable productivity, excellent heat aging resistance and abrasion resistance, and excellent fuel economy; and a pneumatic tire using the rubber composition. The rubber composition contains neither soluble sulfur nor insoluble sulfur, and contains diene rubber, 1-15 parts by mass of compound 1 represented by formula (1) and 0.1-5 parts by mass of compound 2 represented by formula (2), per 100 parts by mass of the diene rubber, and the amount ratio of compound 1 to compound 2 (compound 1/compound 2) is 1-8.

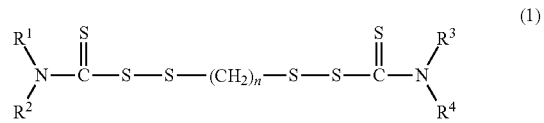

wherein $R^1$-$R^4$ are the same or different, and represent $C_{1-20}$ alkyl, $C_{6-20}$ aryl, or $C_{7-20}$ aralkyl, and n represents an integer of 1-12;

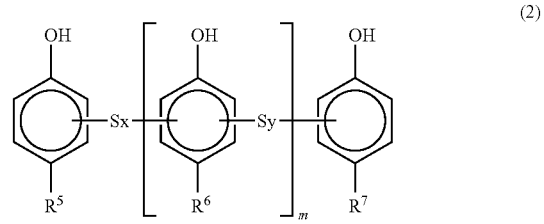

wherein $R^5$-$R^7$ are the same or different, and represent $C_{5-12}$ alkyl, x and y are the same or different, and represent an integer of 2-4, and m represents an integer of 0-10.

13 Claims, No Drawings

RUBBER COMPOSITION FOR TIRE AND PNEUMATIC TIRE

TECHNICAL FIELD

The present invention relates to a rubber composition for a tire and a pneumatic tire using the rubber composition.

BACKGROUND ART

In passenger tires and heavy-load tires used for trucks, buses, etc., it has been required from the safety and economy viewpoints to improve abrasion resistance, cut resistance, and chipping resistance, and improvements of rubber compositions used for tires have been made. Sulfur, as a vulcanizing agent, is commonly used for such rubber compositions for tires. However, it is known that in vulcanized rubbers obtained by vulcanizing natural rubber, etc. with sulfur, crosslinked sulfur chains are cleaved and re-crosslinked by thermal fatigue, and thus the crosslink length is shortened.

For this reason, problematically, heat aging causes the rubbers to be harder, and causes the tensile strength, abrasion resistance, etc. to decrease, resulting in deterioration of tire performance. Also problematically, in sulfur crosslinking, the phenomenon of reversion easily occurs and leads to inferior stability of rubber physical properties.

As a rubber composition for a tire tread that inhibits the deterioration of rubber physical properties caused by reversion or heat aging, Patent Document 1 discloses a rubber composition containing a rubber component, such as natural rubber, in combination with sulfur and an anti-reversion agent, such as 1,6-bis(N,N'-dibenzylthiocarbamoyldithio)hexane.

However, the combined use of sulfur and such an anti-reversion agent extends scorch time, results in longer vulcanization time, and thereby may cause a decrease in productivity. Additionally, since the rubber composition contains sulfur crosslinking, the cleavage and re-crosslinking of sulfur chains caused by thermal fatigue are unavoidable. Therefore, the rubber physical properties are more likely to change, and the performances such as abrasion resistance are not sufficient. Moreover, there has recently been a growing demand for fuel economy of tires.

Patent Document 1: JP-A 2006-45471

SUMMARY OF THE INVENTION

The present invention aims to solve the aforementioned problems and to provide: a rubber composition for a tire, which achieves favorable productivity, excellent heat aging resistance and abrasion resistance, and excellent fuel economy; and a pneumatic tire using the rubber composition.

The present invention relates to a rubber composition for a tire, which comprises neither soluble sulfur nor insoluble sulfur, and which comprises diene rubber, 1 to 15 parts by mass of compound 1 represented by formula (1) and 0.1 to 5 parts by mass of compound 2 represented by formula (2), per 100 parts by mass of the diene rubber, wherein an amount ratio of the compound 1 to the compound 2 (=compound 1/compound 2) is 1 to 8;

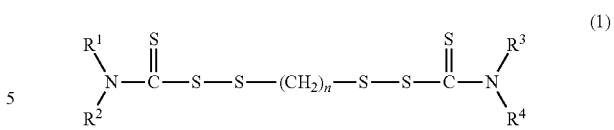

wherein $R^1$ to $R^4$ are the same as or different from one another, and represent a $C_{1-20}$ alkyl group, a $C_{6-20}$ aryl group, or a $C_{7-20}$ aralkyl group, and n represents an integer of 1 to 12;

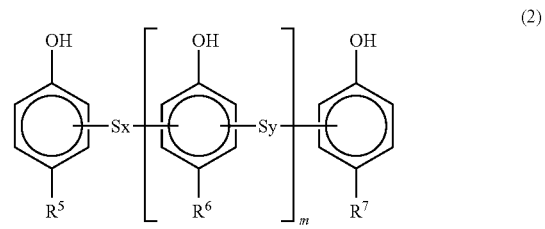

wherein $R^5$ to $R^7$ are the same as or different from one another, and represent a $C_{5-12}$ alkyl group, x and y are the same as or different from each other, and represent an integer of 2 to 4, and m represents an integer of 0 to 10.

The rubber composition for a tire desirably further comprises a sulfenamide vulcanization accelerator. Here, the sulfenamide vulcanization accelerator is desirably N-cyclohexyl-2-benzothiazolylsulfenamide. Moreover, the compound 1 is desirably 1,6-bis(N,N'-dibenzylthiocarbamoyldithio)hexane.

In the rubber composition for a tire, the total amount of natural rubber and modified natural rubber in 100% by mass of the diene rubber is desirably 30 to 100% by mass. Moreover, the rubber composition for a tire desirably further comprises silica.

The present invention also relates to a pneumatic tire, which is produced using the rubber composition.

The present invention relates to a rubber composition for a tire, which contains diene rubber in combination with predetermined amounts of the above compounds 1 and 2, and which contains neither soluble sulfur nor insoluble sulfur. Therefore, the rubber composition can provide excellent heat aging resistance, abrasion resistance, and fuel economy. Moreover, the productivity of the rubber composition is also favorable.

BEST MODE FOR CARRYING OUT THE INVENTION

The rubber composition for a tire of the present invention contains diene rubber in combination with predetermined amounts of the above compounds 1 and 2, and contains neither soluble sulfur nor insoluble sulfur. Since the compounds 1 and 2 are used together as crosslinking agents, and at the same time neither soluble sulfur nor insoluble sulfur is used, the cleavage and re-crosslinking of sulfur chains caused by thermal fatigue can be avoided. Accordingly, as the change in rubber physical properties due to thermal fatigue can be inhibited, it is possible to inhibit deterioration of hardness of the vulcanized rubber composition and deterioration of performances such as tensile strength and abrasion resistance, and therefore to provide excellent heat aging resistance. Thus, excellent abrasion resistance and tensile strength can be provided.

Moreover, a longer scorch time can be prevented, and a suitable scorch time can be provided. For this reason, the productivity of the rubber composition is also favorable. Further, the rubber composition also provides excellent fuel economy.

In the present invention, compound 1 represented by formula (1) and compound 2 represented by formula (2) are used together as crosslinking agents.

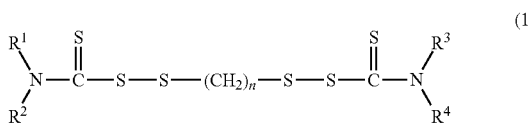

(1)

In formula (1), $R^1$ to $R^4$ are the same as or different from one another, and represent a $C_{1-20}$ alkyl group, a $C_{6-20}$ aryl group, or a $C_{7-20}$ aralkyl group, and n represents an integer of 1 to 12.

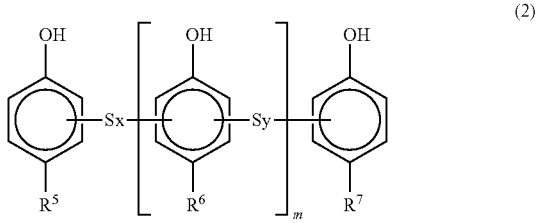

(2)

In formula (2), $R^5$ to $R^7$ are the same as or different from one another, and represent a $C_{5-12}$ alkyl group, x and y are the same as or different from each other, and represent an integer of 2 to 4, and m represents an integer of 0 to 10.

In $R^1$ to $R^4$ of the formula (1), the $C_{1-20}$ alkyl group may be a linear, branched, or cyclic alkyl group. The number of carbon atoms of the alkyl group is desirably 1 to 12. Specific examples of the alkyl group include a methyl group, an ethyl group, an n-propyl group, an isopropyl group, an n-butyl group, an isobutyl group, a sec-butyl group, a tert-butyl group, various pentyl groups, various hexyl groups, various octyl groups, various decyl groups, various dodecyl groups, various tetradecyl groups, various hexadecyl groups, various octadecyl groups, a cyclopentyl group, a cyclohexyl group, and a cyclooctyl group. The $C_{6-20}$ aryl group may have a suitable substituent group, such as a lower alkyl group, on the ring, and the number of carbon atoms of the aryl group is desirably 6 to 9. Specific examples of the aryl group include a phenyl group, a tolyl group, a xylyl group, a naphthyl group, and a methylnaphthyl group. The $C_{7-20}$ aralkyl group may have a suitable substituent group, such as a lower alkyl group, on the ring, and the number of carbon atoms of the aralkyl group is desirably 7 to 10. Specific examples of the aralkyl group include a benzyl group, a methylbenzyl group, a dimethylbenzyl group, a phenethyl group, a methylphenethyl group, a dimethylphenethyl group, a naphthylmethyl group, a (methylnaphthyl)methyl group, a (dimethylnaphthyl)methyl group, a naphthylethyl group, a (methylnaphthyl)ethyl group, and a (dimethylnaphthyl)ethyl group. When $R^1$ to $R^4$ are each an alkyl, aryl or aralkyl group having the number of carbon atoms of the aforementioned range, it is possible to improve heat aging resistance, abrasion resistance, and fuel economy. Among these groups, $C_{2-5}$ alkyl groups and $C_{7-9}$ aralkyl groups are desirable, and a butyl group and a benzyl group are particularly desirable. $R^1$ to $R^4$ may be the same as or different from one another, and are desirably the same as one another in terms of easy production.

In the formula (1), n is an integer of 1 to 12, desirably 2 to 12, and more desirably 3 to 8. When n is 0, abrasion resistance is not sufficiently improved. When n exceeds 12, sufficient hardness is not provided, likely resulting in deterioration of handling stability.

Examples of the compound 1 represented by formula (1) include 1,2-bis(N,N'-dibenzylthiocarbamoyldithio)ethane, 1,3-bis(N,N'-dibenzylthiocarbamoyldithio)propane, 1,4-bis(N,N'-dibenzylthiocarbamoyldithio)butane, 1,5-bis(N,N'-dibenzylthiocarbamoyldithio)pentane, 1,6-bis(N,N'-dibenzylthiocarbamoyldithio)hexane, 1,7-bis(N,N'-dibenzylthiocarbamoyldithio)heptane, 1,8-bis(N,N'-dibenzylthiocarbamoyldithio)octane, 1,9-bis(N,N'-dibenzylthiocarbamoyldithio)nonane, 1,10-bis(N,N'-dibenzylthiocarbamoyldithio)decane, 1,6-bis(N,N'-dioctylthiocarbamoyldithio)hexane, 1,6-bis(N,N'-dibutylthiocarbamoyldithio)hexane, 1,6-bis(N,N'-dicyclohexylthiocarbamoyldithio)hexane, 1,6-bis-(N,N'-di(2-ethylhexyl)thiocarbamoyldithio)hexane, 1,6-bis-(N,N'-diethylthiocarbamoyldithio)hexane, and 1,6-bis-(N,N'-dimethylthiocarbamoyldithio)hexane. Among them, 1,6-bis(N,N'-dibenzylthiocarbamoyldithio)hexane and 1,6-bis(N,N'-dibutylthiocarbamoyldithio)hexane are desirable, and 1,6-bis(N,N'-dibenzylthiocarbamoyldithio)hexane is particularly desirable, because they have thermal stability, excellent dispersibility in rubber, and excellent effects of improving heat aging resistance, abrasion resistance, and fuel economy.

In the compound 2 (alkylphenol-sulfur chloride condensate) represented by formula (2), $R^5$ to $R^7$ are each a $C_{5-12}$ alkyl group and desirably a $C_{6-9}$ alkyl group because the condensates having such groups have good dispersibility in rubber. The alkyl group may be a linear, branched, or cyclic alkyl group. Specific examples of the alkyl group include various hexyl groups, various heptyl groups, various octyl groups, and various nonyl groups. The symbols x and y are each an integer of 2 to 4, and more desirably 2. When x exceeds 4, the condensate tends to be thermally unstable. When x is 1, crosslinking reaction tends to be slow, and hardness tends to be insufficient. The symbol m is an integer of 0 to 10, desirably 1 to 10, and more desirably 1 to 9, because the alkylphenol-sulfur chloride condensates with such ranges of m have good dispersibility in rubber. A specific example of the alkylphenol-sulfur chloride condensate represented by formula (2) is Tackirol V200 (produced by Taoka Chemical Co., Ltd.) in which m is 0 to 10, x and y are each 2, $R^5$ to $R^7$ are each an alkyl group: $C_8H_{17}$, and the sulfur content is 24% by mass.

In the rubber composition of the present invention, the amount of the compound 1 is 1 part by mass or more, and desirably 2 parts by mass or more, per 100 parts by mass of the diene rubber. Also, the amount of the compound 1 is 15 parts by mass or less, and desirably 12 parts by mass or less, per 100 parts by mass of the diene rubber. Less than 1 part by mass of the compound 1 tends to cause insufficient strength, and more than 15 parts by mass thereof tends to lower strength.

The amount of the compound 2 is 0.1 parts by mass or more, desirably 0.2 parts by mass or more, and further desirably 0.4 parts by mass or more, per 100 parts by mass of the diene rubber. Also, the amount of the compound 2 is 5 parts by mass or less, desirably 4 parts by mass or less, and further desirably 2 parts by mass or less, per 100 parts by mass of the diene rubber. Less than 0.1 parts by mass of the compound 2 tends to extend scorch time and thereby increase the vulcanization time; whereas more than 5 parts by mass thereof tends to shorten scorch time and thereby lower storage stability.

In the rubber composition, the amount ratio of the compound 1 to the compound 2 (=compound 1/compound 2 (mass ratio)) is 1 to 8, desirably 2 to 8, and more desirably 3 to 5. An amount ratio thereof less than 1 tends to shorten scorch time and thereby lower storage stability; whereas an amount ratio of more than 8 tends to extend scorch time.

The rubber composition of the present invention contains neither soluble sulfur nor insoluble sulfur. When soluble sulfur and insoluble sulfur are used as crosslinking agents, recrosslinking of sulfur bonds progresses through heat aging, and rubber physical properties deteriorate, leading to a larger decrease in abrasion resistance and strength. Since the present invention does not use these ingredients, such problems can be controlled. Here, the soluble sulfur is a crosslinking agent that has a cyclic structure formed by eight sulfur atoms ($S_8$). The insoluble sulfur is an amorphous, linear sulfur (crosslinking agent) that is insoluble in carbon disulfide, rubbery hydrocarbon, etc. and can be obtained by heating soluble sulfur up to a temperature of not lower than its melting point.

It is to be noted that in the present invention, a peroxide may be added as another crosslinking agent.

Examples of the diene rubber that can be used in the present invention include natural rubber (NR) (deproteinized natural rubber (DPNR), highly purified natural rubber (HPNR), etc.), modified natural rubber (epoxidized natural rubber (ENR), hydrogenated natural rubber (HNR), grafted natural rubber, etc.), isoprene rubber (IR), butadiene rubber (BR), styrene-butadiene rubber (SBR), acrylonitrile-butadiene rubber (NBR), butyl rubber (IIR), and styrene-isoprene-butadiene copolymer rubber (SIBR). It is desirable to contain NR, ENR or IR because they provide excellent abrasion resistance. In addition, it is desirable to contain BR, which provides excellent low-temperature properties and abrasion resistance. Further, it is desirable to use NR and/or modified NR together with BR. These diene rubbers may be used alone, or two or more of these may be used in combination.

Examples of NR include rubbers generally used in the tire industry, such as SIR20, RSS#3, and TSR20. As for ENR and IR, conventionally known commercial products may be used. As for BR, exemplified are BRs with a high cis content (for example, 90% by mass or more), such as BR1220 available from Zeon Corporation, and BR130B and BR150B available from Ube Industries Ltd., and BRs containing syndiotactic polybutadiene crystals, such as VCR412 and VCR617 available from Ube Industries Ltd.

In the rubber composition, the total amount of NR and modified NR in 100% by mass of the diene rubber is desirably 30% by mass or more, more desirably 40% by mass or more, and further desirably 50% by mass or more. When the total amount thereof is less than 30% by mass, abrasion resistance tends to be insufficient. The total amount thereof in 100% by mass of the diene rubber may be 100% by mass, but is desirably 90% by mass or less, and more desirably 80% by mass or less.

When the rubber composition contains BR, the amount of BR in 100% by mass of the diene rubber is desirably 20% by mass or more, more desirably 30% by mass or more, and further desirably 35% by mass or more. An amount thereof less than 20% by mass may result in insufficient improvement of abrasion resistance. The amount thereof in 100% by mass of the diene rubber is desirably 60% by mass or less, more desirably 50% by mass or less, and further desirably 45% by mass or less. An amount of more than 60% by mass tends to cause the vulcanized rubber composition to be easily chipped owing to strength decrease.

In the rubber composition of the present invention, carbon black and/or silica, etc. are desirably used as fillers. The use gives reinforcement and excellent performances such as abrasion resistance, and therefore the effects of the present invention can be obtained favorably. Moreover, grip performance and fuel economy can be improved especially upon blending silica.

The carbon black is not particularly limited, and examples thereof include SAF, ISAF, HAF, FF, and GPF. The carbon black may be used alone, or two or more kinds thereof may be used in combination.

The nitrogen adsorption specific surface area ($N_2SA$) of the carbon black is desirably 80 $m^2/g$ or more, and more desirably 100 $m^2/g$ or more. Also, the $N_2SA$ is desirably 280 $m^2/g$ or less, more desirably 250 $m^2/g$ or less, further desirably 200 $m^2/g$ or less, and particularly desirably 150 $m^2/g$ or less. Further, the $N_2SA$ may be 135 $m^2/g$ or less, and may be 130 $m^2/g$ or less. When the $N_2SA$ of the carbon black is less than 80 $m^2/g$, sufficient wet grip performance tends not to be provided, and abrasion resistance tends to be deteriorated. Moreover, when the $N_2SA$ exceeds 280 $m^2/g$, dispersibility tends to be inferior, likely leading to a decrease in abrasion resistance.

It is to be noted that the $N_2SA$ of the carbon black is determined in accordance with the method A of JIS K6217.

The DBP oil absorption of the carbon black is desirably 105 ml/100 g or more, and more desirably 110 ml/100 g or more. Also, the DBP oil absorption thereof is desirably 140 ml/100 g or less, more desirably 125 ml/100 g or less, and further desirably 120 ml/100 g or less. When a carbon black having such a range of DBP oil absorption is contained together with the aforementioned ingredients, the rubber composition can provide favorable abrasion resistance, heat aging resistance and fuel economy.

The DBP oil absorption of the carbon black is determined in accordance with the measuring method described in JIS K6217-4.

The amount of the carbon black is desirably 5 parts by mass or more, more desirably 10 parts by mass or more, and further desirably 20 parts by mass or more, per 100 parts by mass of the diene rubber. The amount of the carbon black is desirably 150 parts by mass or less, more desirably 100 parts by mass or less, further desirably 50 parts by mass or less, and particularly desirably 40 parts by mass or less, per 100 parts by mass of the diene rubber. An amount thereof less than 5 parts by mass tends to decrease abrasion resistance. On the other hand, an amount thereof more than 150 parts by mass tends to deteriorate processability.

Examples of the silica include, but not particularly limited to, silica produced by a wet process, and silica produced by a dry process. The silica may be used alone, or two or more kinds thereof may be used in combination.

The nitrogen adsorption specific surface area (BET) of the silica is desirably 30 $m^2/g$ or more, more desirably 50 $m^2/g$ or more, further desirably 100 $m^2/g$ or more, and still more desirably 150 $m^2/g$ or more. With the BET of the silica of less than 30 $m^2/g$, abrasion resistance and grip performance tend to be deteriorated. Also, the BET of the silica is desirably 250 $m^2/g$ or less, and more desirably 200 $m^2/g$ or less. When it exceeds 250 $m^2/g$, processability and the dispersibility of silica tend to be deteriorated, which is unlikely to improve performances such as abrasion resistance in a balanced manner.

The nitrogen adsorption specific surface area of the silica is measured by the BET method in accordance with ASTM D3037-81.

The amount of the silica is desirably 5 parts by mass or more, more desirably 10 parts by mass or more, and further desirably 20 parts by mass or more, per 100 parts by mass of the diene rubber. An amount thereof less than 5 parts by mass may not sufficiently improve fuel economy. The amount of the silica is desirably 150 parts by mass or less, more desirably 100 parts by mass or less, further desirably 80 parts by mass or less, and particularly desirably 60 parts by mass or less, per 100 parts by mass of the diene rubber. When it exceeds 150 parts by mass, processability tends to be deteriorated.

The total amount of the carbon black and the silica is desirably 20 parts by mass or more, more desirably 35 parts by mass or more, and further desirably 45 parts by mass or more, per 100 parts by mass of the diene rubber. Also, the total amount thereof is desirably 150 parts by mass or less, more desirably 100 parts by mass or less, and further desirably 75 parts by mass or less, per 100 parts by mass of the diene rubber. Setting the total amount in such a range gives favorable reinforcement, and therefore the effects of the present invention can be obtained favorably.

In the present invention, a silane coupling agent may be used concomitantly with silica. Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, and 3-triethoxysilylpropylbenzothiazolyl tetrasulfide. Among these, from the viewpoints of improvement in reinforcement, etc., bis(3-triethoxysilylpropyl)tetrasulfide, bis(3-triethoxysilylpropyl)disulfide, and 3-trimethoxysilylpropylbenzothiazolyl tetrasulfide are desirable. Each of these silane coupling agents may be used alone, or two or more of these may be used in combination. Oligomers obtained by preliminarily condensing these compounds may also be used.

The blending amount of the silane coupling agent is desirably 1 part by mass or more, and more desirably 2 parts by mass or more, per 100 parts by mass of the silica. An amount thereof less than 1 part by mass tends to increase the viscosity of the unvulcanized rubber composition, likely leading to deterioration of processability. The blending amount of the silane coupling agent is desirably 20 parts by mass or less, and more desirably 15 parts by mass or less, per 100 parts by mass of the silica. When the blending amount exceeds 20 parts by mass, the blending effects of a silane coupling agent tend to become smaller relative to the blending amount, likely resulting in cost increase.

A vulcanization accelerator may be added to the rubber composition of the present invention. Examples of the vulcanization accelerator include sulfenamide, thiazole, thiuram, thiourea, guanidine, dithiocarbamic acid, aldehyde-amine or aldehyde-ammonia, imidazoline, and xanthate vulcanization accelerators. Among these, sulfenamide vulcanization accelerators are particularly desirable because they are particularly effective in improving the cure rate of compound 1.

Examples of the sulfenamide vulcanization accelerators include sulfenamide compounds such as CBS (N-cyclohexyl-2-benzothiazolylsulfenamide), TBBS (N-tert-butyl-2-benzothiazolylsulfenamide), N,N-dicyclohexyl-2-benzothiazolylsulfenamide, N-oxydiethylene-2-benzothiazolylsulfenamide, and N,N-diisopropyl-2-benzothiazolesulfenamide. Among the sulfenamide vulcanization accelerators, CBS is particularly desirable because it excels in the balance between cure rate and physical properties. In addition to the sulfenamide vulcanization accelerator, other vulcanization accelerators may be used together.

The blending amount of the sulfenamide vulcanization accelerator is desirably 0.5 parts by mass or more, and more desirably 0.6 parts by mass or more, per 100 parts by mass of the diene rubber. Also, the blending amount is desirably 8 parts by mass or less, and more desirably 5 parts by mass or less, per 100 parts by mass of the diene rubber. With the blending amount thereof less than 0.5 parts by mass, the cure rate may be slow, and sufficient hardness may not be provided. With the blending amount exceeding 8 parts by mass, the bloom of the accelerator may become large, and storage stability may be deteriorated.

Further, the blending ratio of the sulfenamide vulcanization accelerator to the compound 1 (=sulfenamide vulcanization accelerator/compound 1 (mass ratio)) is desirably in the range of 0.2 to 1, because such a ratio provides excellent balance between processability and physical properties. The blending ratio is more desirably in the range of 0.2 to 0.6.

As well as the above-mentioned ingredients, oils (process oils, vegetable oils and fats, mineral oils, etc.), tackifiers, stearic acid, zinc oxide, various age resistors, waxes, etc. may be appropriately blended in the rubber composition of the present invention.

Examples of the process oils include paraffinic process oils, naphthenic process oils, and aromatic process oils. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, sesame oil, olive oil, sunflower oil, palm kernel oil, camellia oil, jojoba oil, macadamia nut oil, safflower oil, and tung oil. As for the mineral oils, conventionally known commercial products may be used.

The amount of the oil is desirably 0 to 50 parts by mass, more desirably 0 to 40 parts by mass, and further desirably 0 to 30 parts by mass, per 100 parts by mass of the diene rubber. When the oil in an amount adjusted to be in such a range is contained together with the aforementioned ingredients, the rubber composition can provide favorable abrasion resistance, heat aging resistance and fuel economy.

Use of compound 2 may cause burning of a rubber composition; however, the rubber composition of the present invention, even with substantially no retarder, provides a suitable scorch time. This is because the rubber composition contains a combination of compound 1 and compound 2 and contains neither soluble sulfur nor insoluble sulfur. Examples of the retarder include phthalic anhydride, benzoic acid, salicylic acid, N-nitrosodiphenylamine, N,N',N''-tris(isopropylthio)-N,N',N''-triphenylphosphoric triamide, and N-(cyclohexylthio)phthalimide (CTP). In the rubber composition of the present invention, the amount of the retarder is desirably 0.1 parts by mass or less, more desirably 0.05 parts by mass or less, and further desirably 0.01 parts by mass or less, per 100 parts by mass of the diene rubber. Also, the rubber composition may contain no retarder.

The rubber composition of the present invention can be produced by a usual method. For example, the respective ingredients described above are mixed and kneaded by a rubber kneading apparatus such as an open roll mill, a Banbury mixer, or an internal mixer, and are then vulcanized (crosslinked), whereby a rubber composition can be produced.

The rubber composition is applicable to each component of tire, and can be suitably used especially for a tread, a sidewall, and a chafer.

The rubber composition of the present invention is applied suitably to pneumatic tires, and can be used for passenger tires, heavy-load tires, industrial tires, and agricultural tires, for example. It is particularly suitably used for passenger tires.

The pneumatic tire of the present invention can be produced by a usual method with use of the above rubber composition. More specifically, the unvulcanized rubber composition prepared by blending various additives as needed is extruded and processed into a shape of each of tire components and then molded in a usual manner on a tire building machine to form an unvulcanized tire. Then, the unvulcanized tire is subjected to heating and pressing in a vulcanizer to produce a tire.

EXAMPLES

The present invention will be specifically described according to Examples, and is not intended to be limited only to these Examples.

The respective chemical agents used in Examples and Comparative Examples are listed below.
Butadiene rubber: BR150B (produced by Ube Industries, Ltd.)
Natural rubber: TSR20
Silica: Ultrasil VN3 ($N_2SA$: 175 $m^2/g$) (produced by Degussa AG)
Silane coupling agent: Si266
(bis(3-triethoxysilylpropyl)disulfide) (produced by Degussa AG)
Carbon black: SHOBLACK N220 ($N_2SA$: 125 $m^2/g$, DBP oil absorption: 115 ml/100 g) (produced by Cabot Japan K.K.)
Oil: Mineral Oil PW-380 (produced by Idemitsu Kosan Co., Ltd.)
Wax: SUNNOC Wax (produced by Ouchi Shinko Chemical Industrial Co., Ltd.)
Age resistor: NOCRAC 6C
(N-1,3-dimethylbutyl-N'-phenyl-p-phenylenediamine) (produced by Ouchi Shinko Chemical Industrial Co., Ltd.)
Stearic acid: stearic acid (produced by NOF Corporation)
Zinc oxide: Zinc white No. 1 (produced by Mitsui Mining & Smelting Co., Ltd.)
Crosslinking agent 1: KA9188 (produced by Lanxess) (compound 1 represented by formula (1) wherein: $R^1$ to $R^4$=benzyl group, n=6)
Crosslinking agent 2: Tackirol V200 (produced by Taoka Chemical Co., Ltd.) (compound 2 represented by formula (2))
Crosslinking agent 3: trial synthetic compound (compound 1 represented by formula (1) wherein: $R^1$ to $R^4$=butyl group, n=6)
Sulfur: sulfur powder (soluble sulfur) (produced by Tsurumi Chemical industry Co., Ltd.)
Vulcanization accelerator (1): NOCCELER CZ
(N-cyclohexyl-2-benzothiazolylsulfenamide) (produced by Ouchi Shinko Chemical Industrial Co., Ltd.)
Vulcanization accelerator (2): Sanceler TBZTD (tetrabenzylthiuram disulfide) (produced by Sanshin Chemical Industry Co., Ltd.)

Examples 1 to 5 and Comparative Examples 1 to 10

A Banbury mixer was charged with the chemical agents other than the sulfur, the crosslinking agents and the vulcanization accelerator in amounts shown in Table 1, and they were mixed and kneaded for three minutes at 150° C. Thereafter, the sulfur and the vulcanization accelerator were added to the obtained mixture, and they were mixed and kneaded for three minutes at about 80° C. by an open roll mill. Thus, an unvulcanized rubber composition was produced.

The obtained unvulcanized rubber composition was press-vulcanized for 15 minutes at 170° C., whereby a vulcanized rubber composition was produced.

The obtained unvulcanized rubber composition and vulcanized rubber composition were evaluated in the following ways. Table 1 shows the results.
(Scorch Time)

Each of the obtained unvulcanized rubber compositions was subjected to a vulcanization test with an oscillating curemeter (curastometer) described in JIS K6300 at a measurement temperature of 170° C. to give a cure rate curve that plots time and torque. The time to reach ML+0.1ME, t10 (minute(s)), was read. Here, ML refers to the minimum torque of the cure rate curve, MH refers to the maximum torque, and ME refers to the difference (MH-ML). When t10 is short, problems such as poor molding and poor adhesion between components are more likely to occur. When t10 is long, the time that elapses before a vulcanizer is opened becomes longer, resulting in lower production efficiency. In this evaluation, the scorch time (t10) is suitably about 2 to 3 (minutes).
(Abrasion Resistance)

Using a LAT (Laboratory Abrasion and Skid Tester), the volume loss of each vulcanized rubber test piece (vulcanized rubber composition) was measured under the conditions of: a load of 120N, a speed of 20 km/h, and a slip angle of 5°. From the obtained value of volume loss, the abrasion resistance was expressed as an index based on the value of Comparative Example 1, which was regarded as 100. The larger the index, the more excellent the abrasion resistance.
(Hardness)

In accordance with JIS K 6253-1997 "Rubber, vulcanized or thermoplastic—Determination of hardness", the type A durometer hardness was measured for the obtained vulcanized rubber compositions.
(Fuel Economy)

Using a viscoelasticity measuring tester available from TA Instruments Japan K.K. the tan δ of the obtained vulcanized rubber compositions was measured under the conditions of a temperature of 50° C., a frequency of 10 Hz, and an amplitude of 1%. From the obtained value of tan δ, the fuel economy performance was expressed as an index based on the value of Comparative Example 1, which was regarded as 100. The larger the index, the lower the tan δ, leading to excellent fuel economy.
(Heat Aging Resistance)

A No. 3 dumbbell-shaped test piece punched from each vulcanized sample (vulcanized rubber composition) was subjected to a tensile test in accordance with JIS K6251, and the tensile strength (TB) of each test piece was measured. Subsequently, the TB after thermally aging the vulcanized sample at 80° C. for 192 hours was measured. The retention rate of TB before and after aging was calculated by the following formula. The higher the rate, the smaller the change of rubber physical properties caused by heat aging, leading to excellent heat aging resistance.

Retention rate (%)=TB after heat aging/TB before heat aging×100

TABLE 1

| | | Examples | | | | | Comparative Examples | | | | | | | | | |
|---|---|---|---|---|---|---|---|---|---|---|---|---|---|---|---|---|
| | | 1 | 2 | 3 | 4 | 5 | 1 | 2 | 3 | 4 | 5 | 6 | 7 | 8 | 9 | 10 |
| Formu- | Butadiene rubber | 40 | 40 | 40 | 40 | 40 | 40 | 40 | 40 | 40 | 40 | 40 | 40 | 40 | 40 | 40 |
| lation | Natural rubber | 60 | 60 | 60 | 60 | 60 | 60 | 60 | 60 | 60 | 60 | 60 | 60 | 60 | 60 | 60 |
| (part(s) by | Silica | 30 | 30 | 30 | 30 | 30 | 30 | 30 | 30 | 30 | 30 | 30 | 30 | 30 | 30 | 30 |
| mass) | Silane coupling agent | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| | Carbon black | 30 | 30 | 30 | 30 | 30 | 30 | 30 | 30 | 30 | 30 | 30 | 30 | 30 | 30 | 30 |
| | Oil | 25 | 25 | 25 | 25 | 25 | 25 | 25 | 25 | 25 | 25 | 25 | 25 | 35 | 40 | 30 |
| | Wax | 1 | 1 | 1 | 1 | 1 | 1 | 1 | 1 | 1 | 1 | 1 | 1 | 1 | 1 | 1 |
| | Age resistor | 1 | 1 | 1 | 1 | 1 | 1 | 1 | 1 | 1 | 1 | 1 | 1 | 1 | 1 | 1 |
| | Stearic acid | 2 | 2 | 2 | 2 | 2 | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 | 2 | 2 | 2 | 2 | 2 |
| | Crosslinking agent 1 | 2.4 | 2.6 | 2 | 2 | — | — | 4 | — | 3 | 1 | 5 | 2.6 | 20 | 5 | 2 |
| | Crosslinking agent 2 | 0.8 | 0.5 | 1 | 1 | 1 | — | — | 4 | — | 2 | 0.4 | 0.2 | 3 | 10 | 1 |
| | Crosslinking agent 3 | — | — | — | — | 2 | — | — | — | — | — | — | — | — | — | — |
| | Sulfur | — | — | — | — | — | 1.2 | — | — | 0.1 | — | — | 0.1 | — | — | 1.2 |
| | Vulcanization accelerator (1) | 0.8 | 0.8 | 0.8 | — | 0.8 | 0.8 | 0.8 | 0.8 | 0.8 | 0.6 | 0.3 | 0.8 | 10 | 2 | 0.8 |
| | Vulcanization accelerator (2) | — | — | — | 0.8 | — | — | — | — | — | — | — | — | — | — | — |
| | Amount ratio of crosslinking agent 1 or 3/crosslinking agent 2 | 3 | 5.2 | 2 | 2 | 2 | — | — | — | — | 0.5 | 12.5 | 13 | 6.7 | 0.5 | 2 |
| Evaluation | Scorch time | 2.3 | 2.6 | 1.9 | 2.7 | 2.6 | 2.4 | 6.5 | 1.1 | 5.1 | 1.6 | 3.8 | 2.3 | 4.7 | 0.6 | 1.9 |
| | Abrasion resistance | 125 | 126 | 120 | 118 | 120 | 100 | 128 | 96 | 109 | 109 | 111 | 99 | 87 | 78 | 98 |
| | Hardness | 60 | 60 | 61 | 60 | 59 | 60 | 59 | 60 | 60 | 59 | 59 | 59 | 60 | 61 | 60 |
| | Fuel economy | 111 | 109 | 116 | 115 | 118 | 100 | 100 | 108 | 99 | 104 | 102 | 100 | 94 | 114 | 109 |
| | Heat aging resistance | 90 | 91 | 88 | 87 | 89 | 81 | 82 | 80 | 79 | 80 | 82 | 80 | 82 | 81 | 80 |

In Examples in which compounds 1 and 2 were used together as crosslinking agents, and soluble sulfur and insoluble sulfur were not used, heat aging resistance was excellent and abrasion resistance was favorable. In addition, scorch time was suitable and fuel economy was excellent. On the other hand, in Comparative Examples, heat aging resistance was inferior on the whole. In Comparative Example 1 with the use of soluble sulfur as a crosslinking agent, abrasion resistance and fuel economy were inferior. In Comparative Examples 2 and 4 without the use of crosslinking agent 2 represented by formula (2), scorch time was long and fuel economy was also inferior. In Comparative Example 3 without the use of crosslinking agents 1 and 3 each represented by formula (1), abrasion resistance was inferior and scorch time was short.

In Comparative Example 5 with a low blending ratio of crosslinking agent 1 represented by formula (1)/crosslinking agent 2 represented by formula (2), abrasion resistance and fuel economy were inferior. Also in Comparative Examples 6 and 7 with a high blending ratio thereof, abrasion resistance and fuel economy were inferior.

Also in Comparative Examples 8 and 9 with a large amount of crosslinking agent 1 represented by formula (1) or crosslinking agent 2 represented by formula (2), performances were inferior. In Comparative Example 10 with the use of soluble sulfur as well as crosslinking agents 1 and 2, abrasion resistance was inferior.

The invention claimed is:
1. A rubber composition for a tire,
which does not contain either soluble sulfur or insoluble sulfur, and
which comprises diene rubber,
2 to 15 parts by mass of compound 1 represented by formula (1) and 0.4 to 5 parts by mass of compound 2 represented by formula (2), per 100 parts by mass of the diene rubber,
wherein an amount ratio of the compound 1 to the compound 2 (compound 1/compound 2) is 2 to 8;

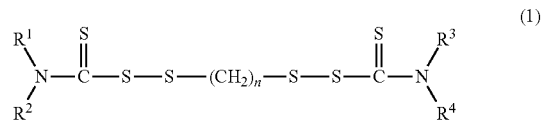

wherein $R^1$ to $R^4$ are the same as or different from one another, and represent a $C_{1-20}$ alkyl group, a $C_{6-20}$ aryl group, or a $C_{7-20}$ aralkyl group, and
n represents an integer of 1 to 12;

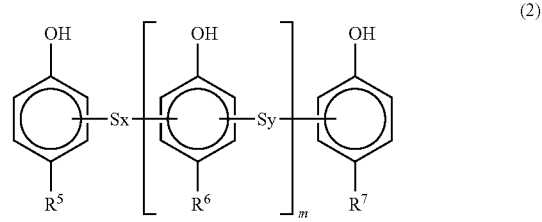

wherein $R^5$ to $R^7$ are the same as or different from one another, and represent a $C_{5-12}$ alkyl group,
x and y are the same as or different from each other, and represent an integer of 2 to 4, and
m represents an integer of 0 to 10.

2. The rubber composition for a tire according to claim 1, which further comprises a sulfenamide vulcanization accelerator.

3. The rubber composition for a tire according to claim 2, wherein the sulfenamide vulcanization accelerator is N-cyclohexyl-2-benzothiazolylsulfenamide.

4. The rubber composition for a tire according to claim 1, wherein the compound 1 is 1,6-bis(N,N'-dibenzylthiocarbamoyldithio)hexane.

5. The rubber composition for a tire according to claim 1, wherein the total amount of natural rubber and modified natural rubber in 100% by mass of the diene rubber is 30 to 100% by mass.

6. The rubber composition for a tire according to claim 1, which further comprises silica.

7. A pneumatic tire, which is formed from the rubber composition according to claim 1.

8. The rubber composition for a tire according to claim 1, wherein the diene rubber contains natural rubber and/or modified natural rubber and butadiene rubber,
the total amount of the natural rubber and the modified natural rubber in 100% by mass of the diene rubber being 30 to 80% by mass, and
the amount of the butadiene rubber in 100% by mass of the diene rubber being 20 to 60% by mass.

9. The rubber composition for a tire according to claim 1, which further comprises carbon black and silica,
the amount of the carbon black being 5 parts by mass or greater, the amount of the silica being 5 parts by mass or greater, and the total amount of the carbon black and the silica being 20 to 150 parts by mass, per 100 parts by mass of the diene rubber.

10. The rubber composition for a tire according to claim 9, wherein the nitrogen adsorption specific surface area of the carbon black is 80 to 280 $m^2/g$, and the nitrogen adsorption specific surface area of the silica is 30 to 250 $m^2/g$.

11. The rubber composition for a tire according to claim 1, wherein the blending amount of a sulfenamide vulcanization accelerator is 0.5 to 8 parts by mass per 100 parts by mass of the diene rubber,
the blending ratio of the sulfenamide vulcanization accelerator to the compound 1 (mass ratio) being in the range of 0.2 to 1, and
wherein an amount of oil is present at 0 to 50 parts by mass per 100 parts by mass of the diene rubber.

12. The rubber composition for a tire according to claim 1, wherein the amount of at least one retarder selected from the group consisting of phthalic anhydride, benzoic acid, salicylic acid, N-nitrosodiphenylamine, N,N',N''-tris (isopropylthio)-N N',N''-triphenylphosphoric triamide, and N-(cyclohexylthio) phthalimide (CTP) is 0.1 parts by mass or less, per 100 parts by mass of the diene rubber.

13. A pneumatic tire, which is formed from the rubber composition according to claim 2.

\* \* \* \* \*